United States Patent [19]
Press

[11] 3,898,806
[45] Aug. 12, 1975

[54] NOISE REDUCTION APPARATUS
[75] Inventor: Robert J. Press, Pinole, Calif.
[73] Assignee: Sargent Industries, Inc., Los Angeles, Calif.
[22] Filed: May 17, 1974
[21] Appl. No.: 470,861

[52] U.S. Cl. ............ 60/330; 60/327; 60/364; 60/428; 60/431; 60/468; 60/469; 214/83.3
[51] Int. Cl. ............................................ F16d 33/00
[58] Field of Search...... 60/327, 330, 364, 420-428, 60/431, 435, 437, 438, 468, 469, 698, 700, 717; 74/687, 720, 720.5, 730

[56] References Cited
UNITED STATES PATENTS

| | | | |
|---|---|---|---|
| 3,006,199 | 10/1961 | Christenson et al. | 74/730 X |
| 3,388,684 | 6/1968 | Gros et al. | 60/698 X |
| 3,459,131 | 8/1969 | Senf | 91/47 X |
| 3,803,843 | 4/1974 | Nyman et al. | 60/431 X |
| 3,822,551 | 7/1974 | Smith | 60/428 |

*Primary Examiner*—Edgar W. Geoghegan
*Attorney, Agent, or Firm*—Ellsworth R. Roston

[57] ABSTRACT

A noise reduction apparatus for operating a variable volume and variable pressure load. The apparatus includes pump means having a capacity which is sufficiently large to supply the load at a relatively low pump speed with the pump means being driven by engine means operably connected to the pump means through a torque converter and an automatic transmission. The engine means thereby supplies power to the pump means with the engine means performing a secondary work function at a speed near the idling speed of the engine means. A torque converter includes a converter pump driven by the engine means and a converter turbine which is connected to the automatic transmission.

Associated with the torque converter are lockup means and a governor which controls the lockup means to lock the converter pump to the converter turbine at predetermined intervals during the shift pattern of the automatic transmission when the engine means is performing its primary work function. Bypass means are included to bypass the governor and to actuate the lockup means at speeds near the idling speed of the engine means when the engine is supplying power to the pump means in performing a secondary work function. Thus, the engine means operates in the low noise level region at speeds near its idling speed when supplying power for the pump means through the torque converter and automatic transmission with the torque converter being locked up to eliminate slippage between the converter pump and converter turbine.

36 Claims, 4 Drawing Figures

NOISE REDUCTION APPARATUS

BACKGROUND OF THE INVENTION

With the increasing concern of society in protecting and improving the environment, the problem of noise pollution is receiving much study. People who live in cities are surrounded by all manner and variety of noises ranging from the roar of jet planes to the rumble of freeway traffic. This vast accumulation of noise can be quite harmful in causing diminished hearing. Also, although not precisely measurable, noise can and does have an adverse effect upon the emotional stability and mental health of the recipients.

A common source of noise in a city is the noise of a truck engine as it turns over at high speeds in operating auxiliary equipment carried on the truck. As one example, consider the noise of a truck engine in operating the packing mechanism for refuse collection equipment during pick-up of refuse in a residential neighborhood. The collection of refuse begins early in the morning. Thus, the noise of the laboring truck engine operating at high speed may well be the first sound which greets the ear of a city resident on awakening.

Many types of auxiliary truck equipment, such as the packing mechanism for a refuse loader, go through a cycling operation in which the load requirements on the engine will vary. For example, in the operation of a refuse packing mechanism, the refuse will first be placed in a hopper positioned within a tailgate structure on a truck. The refuse is then swept from the hopper and moved through an opening connecting the hopper with a refuse storage body positioned on the truck frame. As the refuse is moved into the opening and packed under great pressures, the pressure demands of the packing mechanism are very high. The pressure demands at this stage of packing are generally considerably higher, for example, than the pressure demands when the refuse is being swept from the hopper. For a more detailed description of a refuse packing mechanism, reference is made to U.S. Pat. No. 2,879,906, issued Mar. 31, 1959.

During operation of an auxiliary load on a truck, it was previously necessary to maintain the truck engine at a relatively high speed when the auxiliary load was a variable load, as in the case of a refuse packing mechanism. This was done to prevent the truck engine from stalling when the power demands imposed by the variable load were increased. To prevent stalling, it was customary to maintain the truck engine at a relatively high speed to provide the output from the engine at a level sufficient to operate the variable load under the maximum power conditions imposed by the load. This method of operation, while perhaps satisfactory to prevent stalling, was inefficient and produced a high noise level from the truck engine in driving the auxiliary load.

Recently, a means has been devised to operate an auxiliary load on a truck, such as a refuse packing mechanism, at relatively low noise levels. This means is disclosed in commonly assigned application Ser. No. 274,798, now U.S. Pat. No. 3,812,676, granted May 28, 1974, which is incorporated herein by reference. In accord with this recent improvement, a variable volume and variable pressure auxiliary hydraulic load on the truck is driven by a pump which has a capacity sufficiently large to supply the demands of the load when the pump is operating at a relatively low speed. The truck engine is connected to the pump in supplying power to the pump and the engine is then operated at a relatively low speed near the idling speed of the engine. When functioning in this manner, the engine is operated at about one-quarter to one-third or less of its maximum speed and horsepower with the engine operating at a low noise level in providing power for operation of the auxiliary load.

Most heavy duty trucks are equipped with a torque converter and an automatic transmission through which the engine supplies power in performing its primary work function. The placement of the truck engine, torque converter, automatic transmission, truck radiator, truck frame, etc., are all fixed by the design requirements of the truck manufacturer. Thus, the manufacturer of auxiliary truck equipment, such as a refuse packing mechanism, a cement mixer, etc., must, to a certain extent, modify his equipment to make it fit the design requirements imposed by the truck manufacturer.

The manufacturer of auxiliary equipment will normally purchase trucks from the truck manufacturer and then mount the auxiliary equipment on the trucks to provide a finished unit such as a transit cement mixer, a garbage truck, a dump truck, etc. In mating the auxiliary equipment to the purchased truck to provide a finished unit, it is therefore imperative that the truck design and the design of the auxiliary equipment be compatible.

In the manufacture of original specialized equipment, it may be possible to purchase trucks which are modified to match the design requirements imposed by auxiliary equipment to be mounted on the truck frame. Thus, the truck manufacturer may agree to supply a truck whose radiator has been altered, for example, to permit positioning of a drive shaft on the engine which extends forwardly to drive auxiliary equipment mounted forwardly of the engine. However, if the modifications required of the truck manufacturer are too extensive, the truck manufacturer may simply refuse to supply trucks to the modified specifications because the modifications would interfere with the overall functioning of the truck in performing its primary work function, which is to move the truck over the road.

The problems of manufacturing auxiliary equipment are multiplied manyfold when the auxiliary equipment is to be installed on existing equipment in a retrofit installation. Thus, in the case of a silencing mechanism for reducing noise pollution, the manufacturer of the auxiliary equipment must contend with the fact that there are millions of dollars of existing equipment such as garbage trucks, cement mixers, etc., which cannot be scrapped by their owners without serious economic consequences, even though the existing equipment generates a high level of noise in its operation. A meaningful solution to the problem of noise pollution, thus, demands a noise reduction system which is compatible with existing equipment in retrofit installations to permit the use of the existing equipment at low noise levels. This would, then, permit the states or the federal government to set permissible noise levels for the operation of specialized equipment such as garbage trucks, cement mixers, etc., without undue hardship on the owners of existing equipment who could retrofit their equipment to meet the new standards.

In retrofitting existing equipment for operation at a low noise level, such as a garbage truck, it would be desirable if the auxiliary load could be driven in some manner through the automatic transmission and torque converter which are standard equipment on most heavy-duty trucks. However, the torque converters and automatic transmissions of heavy-duty trucks are not designed primarily for the performance of a secondary work function by the truck engine. Rather, the torque converters and automatic transmissions are designed in terms of the primary work function of the truck engine. Thus, in the performance of a torque converter and an automatic transmission for a heavy-duty truck, the functioning of the transmission and torque converter are controlled by the speed of the truck over the road.

At low truck speeds, the automatic transmission provides a low gear ratio between the truck engine and the rear axle and, as the truck speed is increased, the transmission goes through a shift cycle that is determined by the truck speed. The functioning of the torque converter is keyed to the functioning of the automatic transmission with the torque converter including a pump that is driven by the truck engine and a turbine which is connected to the transmission. At low engine speeds, there is considerable slippage between the converter pump and the converter turbine with the converter pump turning over at a higher rpm than the turbine and with hydraulic fluid within the converter being forced by the converter pump into impingement with the vanes of the converter turbine to cause movement of the turbine and the automatic transmission connected thereto. At low engine speeds, the torque converter, thus, acts as a fluid coupling between the truck engine and the truck transmission. The torque converter transmits power to the transmission while reducing shock to the transmission and engine through hydraulic slippage between the converter pump and the converter turbine.

As the truck increases in speed over the road, the automatic transmission goes through a shift cycle with the functioning of the torque converter being keyed to the shift cycle of the transmission. Thus, at higher speeds, the torque converter may be locked up to provide direct drive to the transmission when the transmission is in a higher gear such as fourth or fifth gear. With the torque converter locked up, the converter pump is locked to the converter turbine such that they rotate in unison. Lockup of the torque converter may be accomplished, for example, through a clutch mechanism which is actuated by hydraulic fluid fed to the clutch mechanism through a governor. The governor may, for example, function as a pressure reducer with the governor receiving high pressure hydraulic fluid from the torque converter and transmitting lower pressure hydraulic fluid to the clutch mechanism. In functioning, the governor may, then, transmit sufficient pressure to the clutch mechanism to lockup the torque converter when the pressure of hydraulic fluid received by the governor exceeds some predetermined value. Since the pressure of hydraulic fluid received by the governor from the torque converter is related to the rotational speed of the converter pump which is determined by engine speed, the functioning of the governor may be directly tied to the engine speed.

The shift cycle of an automatic transmission, coupled with a torque converter for a heavy-duty truck, is not designed for transmission of power from the truck engine to a variable auxiliary load with the engine operating at a low speed near its idling speed. Thus, at present, there is no satisfactory way to operate an auxiliary load by a truck engine operating at a speed near its idling speed with the power transmitted from the engine to the load through the torque converter and automatic transmission. Accordingly, it would be desirable if a noise reduction system and apparatus could be devised which would employ a truck engine operating through a torque converter and an automatic transmission to efficiently transmit power to a variable auxiliary load with the truck engine operating at a relatively low speed near its idling speed. Such a system could then be employed in retrofitting existing specialized equipment, such as garbage trucks, transit concrete mixers, dump trucks and the like. This would provide a great reduction in noise levels in operating specialized equipment and, at the same time, would make it possible for the owners of existing equipment to meet more stringent noise level requirements without purchasing new equipment or scrapping existing equipment.

SUMMARY OF THE INVENTION

In providing a noise reduction system and apparatus which is compatible with existing equipment in retrofitting the equipment for operation at reduced noise levels, an engine means is operably connected to a pump means having a capacity which is sufficiently large to supply a variable volume and variable pressure auxiliary load. The engine means is operably connected to the pump means through a torque converter and an automatic transmission with the engine means performing a secondary work function at a speed near the idling speed of the engine means.

The torque converter includes a converter pump which is driven by the engine means and a converter turbine which is connected to the automatic transmission. Lockup means and a governor which controls the lockup means determine the manner in which the torque converter is operated during the normal shift pattern of the automatic transmission when the engine means is performing its primary work function in powering a truck over the road. In addition, however, there is a bypass means which bypasses the governor and actuates the lockup means at speeds near the idling speed of the engine means when the engine means is supplying power to the pump means in performing a secondary work function.

In this manner, the engine means may operate at a low noise level region at speeds near its idling speed when supplying power for the pump means through the torque converter and automatic transmission with the torque converter being locked up to eliminate slippage between the converter pump and converter turbine. Power is, thus, efficiently transmitted from the engine means to the pump means without loss in the torque converter due to slippage between the converter pump and converter turbine.

Additionally, the noise reduction apparatus may include a power take off which is connected to the transmission with the engine means being operably connected to the pump means through the torque converter and power take off. The bypass means, which bypasses the governor in actuating the lockup means, may be manually operable through actuating means. The actuating means may, for example, include a solenoid and a switch with actuation of the switch causing movement of the solenoid to actuate the bypass means.

In the use of a power take off, engaging means may be employed to engage or disengage the power take off from the transmission. Most desirably, the actuating means for the bypass means is operably connected to both the bypass means and the power take off. In this manner, the bypass means and power take off may be actuated in unison with the engine means operating at a speed near its idling speed in driving the pump means through the torque converter, automatic transmission and power take off and with the torque converter locked up to eliminate slippage between the converter pump and the converter turbine.

In providing power from the engine means to operate a variable volume and variable pressure auxiliary load, a fluid reservoir may be provided in flow communication with the pump means and the variable load. The function of the fluid reservoir may be to provide a variable volume of hydraulic fluid for operation of the variable load. The pump means may be a variable displacement pump or a plurality of fixed displacement pumps. Also, means may be provided to control the displacement of the variable displacement pump or to control the number of fixed displacement pumps in operation to supply fluid to the variable load. The displacement of the variable displacement pump or the number of fixed displacement pumps supplying fluid to the load may be controlled by the volume and pressure demands of the variable load. Thus, when the pressure demands of the load are increased, the displacement of the variable displacement pump or the number of fixed displacement pumps in operation may be reduced. As a result, the torque required to drive the pump means may be maintained below a predetermined level which may be supplied by the engine means operating at a speed near its idling speed.

In using the engine means to provide power to the pump means in the performance of a secondary engine work function, engine governor means may be used to assist in maintaining the horsepower output of the engine means at a level sufficient to drive the pump means while maintaining the speed of the engine means at a speed near its idling speed. In one form, the engine governor means may, for example, include a throttle control means which governs the flow of fuel to the engine means. The flow rate of fuel to the engine means may, thus, be adjusted in response to the pressure and volume demands of the variable auxiliary load such that the torque output of the engine is maintained at a level that is sufficient to operate the pump means without stalling of the engine means under the load conditions imposed by the variable load.

The present noise reduction system and apparatus is admirably suited for operation of a refuse packing mechanism since the load demands of a packing mechanism will vary considerably during its overall cycle. At certain portions in the load cycle of the packing mechanism, the mechanism may be operated at relatively high speeds when the mechanism does not encounter high resistance from the refuse being packed. Under these portions of the load cycle, the packing mechanism may be operated with a relatively high volume of hydraulic fluid under a relatively low pressure. However, during other portions of the load cycle of a refuse packing mechanism, the mechanism may encounter high resistance from the material being packed. During these portions of the load cycle, it is necessary to supply hydraulic fluid under high pressures to the packing mechanism. Thus, the pressure demands of the packing mechanism are increased and, in supplying these pressure demands, the volume of fluid fed to the packing mechanism from the pump means may be reduced. This, then, permits operation of the packing mechanism, albeit at a lower speed, by the engine means in performing a secondary work function with the engine means operating at a speed near its idling speed. The engine means may, thus, provide the necessary power and, at the same time, the overall refuse packing operation may be carried out at a relatively low noise level.

DESCRIPTION OF THE DRAWINGS

To further illustrate the invention, in terms of a preferred embodiment thereof, reference is made to the accompanying drawings in which.

DETAILED DESCRIPTION

Figure 1:
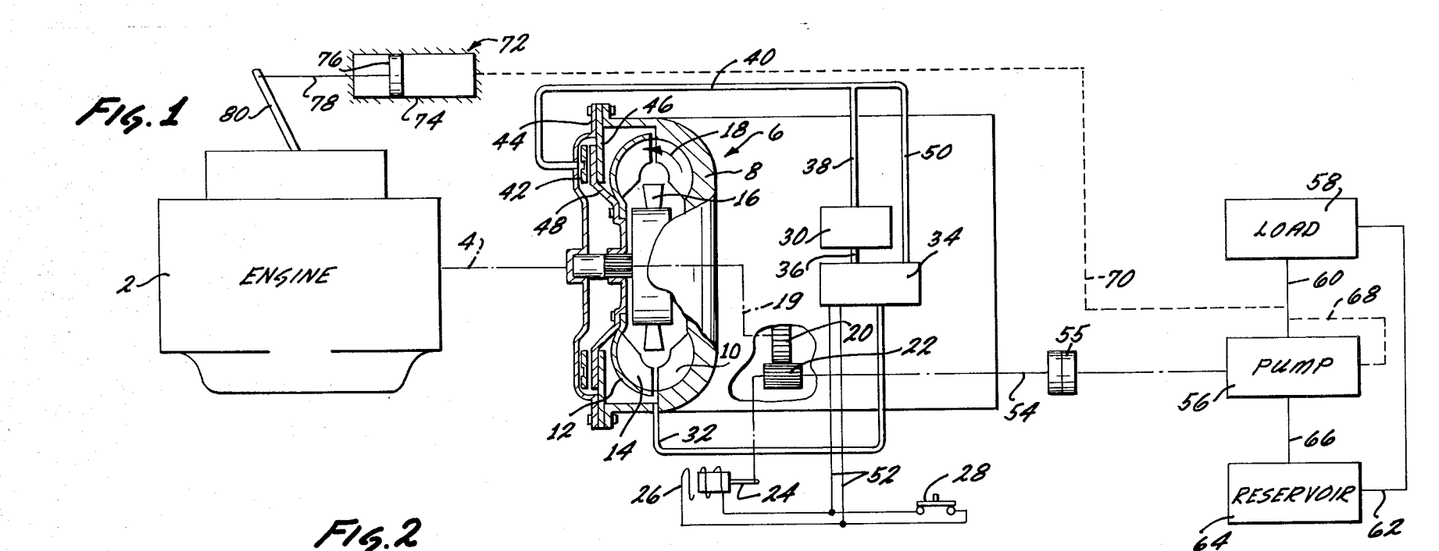
FIG. 1 is a schematic view illustrating a noise reduction apparatus in which power is supplied from an engine operating at a speed near its idling speed to perform a secondary work function with a pump being driven by the engine through a torque converter and an automatic transmission with means provided to bypass the governor that controls the normal operation of the torque converter to lock up the torque converter at a speed near the idling speed of the engine means.

With reference to FIG. 1, a relatively large engine 2, whose primary work function may be in driving a truck, is used in the performance of a secondary work function in providing power to a variable auxiliary load. The engine 2 includes a drive shaft 4 leading to a torque converter, generally indicated as 6, and the torque converter includes a converter pump 8 which is driven by the engine through shaft 4. The converter pump 8 may include vanes 10 which impart rotational and centrifugal movement to hydraulic fluid that is transmitted to a converter turbine 12 having vanes 14. After contacting the converter turbine 14, the hydraulic fluid may encounter a stator 16. The general path of the hydraulic fluid within the torque converter is indicated by arrow 18.

The use of a pump, a turbine, and a stator is common to all torque converters. Thus, the illustration of a torque converter in partial view in FIG. 1 is not meant to imply that the present noise reduction system requires a specific type of torque converter. Rather, it is intended to illustrate that the present system and apparatus is applicable to any type of a torque converter.

The converter turbine 12 is connected through a drive shaft or drive train 19 to an automatic transmission 20 which is represented by a fragmentary view of a gear. As in the case of the torque converter 6, the automatic transmission 20 employed in the present noise reduction system is of standard construction and will, thus, not be described in detail. Connected to the automatic transmission 20 is a power take off 22 which may be moved into or out of engagement with the transmission through an actuating shaft 24 controllable by a solenoid 26 and a switch 28. A power take off 22 may be used, as will be described, in transmitting power to a variable auxiliary load which is powered by the engine 2 in performing a secondary work function at speeds near the idling speed of the engine.

During normal functioning of the torque converter 6 and the automatic transmission 20, the torque converter may be locked up at predetermined intervals during the shift cycle of the transmission when the engine 2 is performing its primary work function, i.e., providing power to move a truck over the road. Normally, lockup of the torque converter 6 occurs during the high end of the shift cycle of the transmission 20 such as, for example, when the transmission is in its fourth or fifth forward gear and the truck is operating at a high rate of speed. In controlling the lockup of the torque converter 6, during which the converter pump 8 is locked to the converter turbine 12, a governor 30 may direct hydraulic fluid through a line 38 and a line 40 to a clutch plate 42.

In the arrangement illustrated, when the clutch plate 42 receives hydraulic fluid through line 40 under sufficiently high pressure, the clutch plate is moved into engagement with a clutch plate 48 which is then pressed into engagement with a further clutch plate 46. The clutch plate 46 may be connected to the pump housing 44 which may be formed integrally with the converter pump 8 such that the converter pump, converter housing, and the clutch plate 46 rotate as a unit. The clutch plate 48, as illustrated, may be secured in any convenient manner to the converter turbine 12 such that the converter turbine and the clutch plate 48 rotate as a unit. When the clutch plates 46 and 48 are pressed into engagement by movement of the clutch plate 42, the net result is that the torque converter 6 is locked up with the converter pump 8 being locked to the converter turbine 12 such that the pump and turbine rotate as a unit without any hydraulic slippage between the pump and turbine.

The governor 30, as illustrated in FIG. 1, acts as a pressure reducer with the governor receiving high pressure hydraulic fluid through a line 32, a valve 34, and a hydraulic line 36. The pressure of the hydraulic fluid received through line 32 will be directly related to the speed of rotation of the converter pump 8 which is, in turn, related to the speed of the engine 2. The functioning of the governor 30 may, therefore, be directly related to the speed of the engine 2 with the governor feeding hydraulic pressure through line 38 to move the clutch plate 42 when the engine reaches a predetermined speed.

Governors are well known to the art and, thus, the present noise reduction system and apparatus is not restricted to the use of a governor which functions in the particular manner described in regard to FIG. 1. For example, the governor 30 may be in the form of a solenoid which is electrically actuated by a centrifugal switch connected to the outpupt shaft 4 from the engine 2. Thus, the centrifugal switch may be set to close at a predetermined rotational speed of the output shaft 4 to actuate the governor which would then move the clutch plate 42 to lock up the torque converter 6.

The valve 34, as illustrated in FIG. 1, may be utilized to bypass the governor 30 such that the torque converter 6 may be locked up by the operator without regard for the normal shift cycle of the automatic transmission 20. In this regard, the functioning of the torque converter 6 may be radically altered from its normal operation in which the torque converter is only locked up at predetermined times during the shift cycle of the automatic transmission 20. The valve 34, as indicated, may be a standard two-position valve with the valve in one position directing fluid through line 36 to the governor 30 during operation of the engine 2 in performing its primary work function in delivering power through the torque converter 6 and automatic transmission 20 in powering a truck over the road. In a second position, the valve 34 completely bypasses the governor 30 with the valve receiving high pressure hydraulic fluid through line 32 and feeding the high pressure fluid through a line 50 and line 40 directly to the movable clutch plate 42.

As illustrated, the valve 34 does not function as a pressure reducer as does the governor 30. Thus, when the governor 30 is bypassed with the valve 34 in its second position, the hydraulic fluid directed to the clutch plate 42 is at a sufficiently high pressure to lockup the torque converter 6 even when the engine 2 is operating at low speeds near its idling speed. The valve 34 may be controlled through control lines 52 which direct an electrical signal to the valve in moving it from one position to another. The valve 34, as stated, is of standard construction and may, for example, be composed of a valve body which is spring biased to a first position in which the valve directs hydraulic fluid through line 36 to the governor 30. On receipt of a signal through the lines 52 on closing of switch 28, the body of the valve 34 may be moved, in the manner of a solenoid, to its second position to bypass the governor 30 in feeding high pressure hydraulic fluid directly to the movable clutch plate 42.

As illustrated, it is preferable that the movement of the valve 34 and the power take off 22 be coordinated by closing of switch 28 so that the power take off is engaged in unison with bypassing of the governor 30 to lockup the torque converter 6. Similarly, when the power take off 22 is disengaged from the transmission 20, the valve 34 is moved to its first position with hydraulic fluid then being directed through line 36 to the governor 30 for normal operation of the torque converter 6 and transmission 20.

The power take off 22 is connected through a drive shaft or drive train 54 to a pump 56 which may be a standard variable displacement pump including, for example, a swash plate whose angle may be varied in controlling the stroke of the pump pistons. Also, the pump 56 may be a single fixed displacement pump having a relatively large capacity which is adequate to supply a variable load 58 under any operating condition of the variable load. Further, the pump 56 may be a plurality of fixed displacement pumps which are controllable, in a manner to be described, to vary the volume and the pressure of hydraulic fluid directed to the variable load 58 in response to the demands of the variable load.

Optionally, a clutch 55 of standard construction may be interposed between the power take off 22 and the pump 56. The clutch 55 may, for example, be actuated by a centrifugal switch to automatically disengage the drive between the power take off 22 and the pump 56 when the speed of the drive shaft or drive train 54 exceeds a predetermined value. The clutch 55 may, then, serve as a means to prevent overloading of the pump 56 or the variable load 58 which could occur if the pump speed were excessive.

In general, the automatic transmission 20 will be shifted to a neutral position during usage of the power take off 22 with the torque converter 6 being locked up through actuation of the valve 34. In this mode of operation, the clutch 55 is not needed and, thus, may be eliminated such that there is direct drive from the power take off 22 to the pump 56.

The pump 56 supplies hydraulic fluid through a line 60 to the load 58, which may be a variable pressure and variable volume load, as, for example, in the case of a refuse packing mechanism. After use of the hydraulic fluid in operation of the variable load 58, the hydraulic fluid may be returned through a return line 62 to a fluid reservoir 64. The reservoir 64 may, thus, serve in storing hydraulic fluid for use in powering the load 58 when the load requires a high volume of hydraulic fluid. Conversely, when the load 58 requires only a low volume of high pressure hydraulic fluid, excess hydraulic fluid may be stored in the reservoir 64 for use at a later time. Hydraulic fluid is drawn from the reservoir 64 by the pump 56 through a line 66 which feeds fluid to the inlet of the pump.

A pump control line 68 may be utilized in controlling the operation of the pump 56 when the pump is a variable displacement pump or a plurality of fixed displacement pumps. Thus, for example, the control line 68 may be used to sense the pressure in the line 60 which is a function of the demands of the variable load 58. If, for example, the load 58 requires hydraulic fluid at a high pressure, e.g., during the compaction portion of the load cycle of a refuse packing mechanism, the high pressure which is sensed through control line 68 may be used to reduce the capacity of the pump 56. Thus, the pressure received through line 68 may be fed to a piston connected to a swash plate (not shown) to vary the angle of the swash plate in reducing the capacity of the pump. By, thus, reducing the capacity of the pump 56, the torque required to operate the pump may be maintained relatively constant even though the pump is now supplying higher pressure hydraulic fluid to the variable load 58. By maintaining the torque requirements of the pump 56 relatively constant, the pump may, thus, be driven by the engine 2 while the engine is operating at a reduced speed near its idling speed in performing a secondary work function.

An engine governor of standard construction may be used to control the operation of the engine 2 to prevent the engine from stalling while performing its secondary work function in driving the pump 56. The engine governor may, for example, be responsive to the torque required to drive the pump 56 with the governor automatically increasing the fuel supply to the engine 2 to prevent the engine's stalling when the torque input requirements of the pump are increased.

One form of an engine governor, which is illustrated in FIG. 1, may include a control line 70 which senses either the volume, pressure, or both the volume and pressure of hydraulic fluid in the line 60 which is fed to an engine governor 72 including a cylinder 74, a piston 76 and a shaft 78. The shaft 78 may be connected to a throttle control arm 80 with movement of the piston 76 in response to changes in the volume or pressure of hydraulic fluid in line 60 causing movement of the control arm 80 to increase or decrease the fuel being supplied to engine 2.

Figure 2:
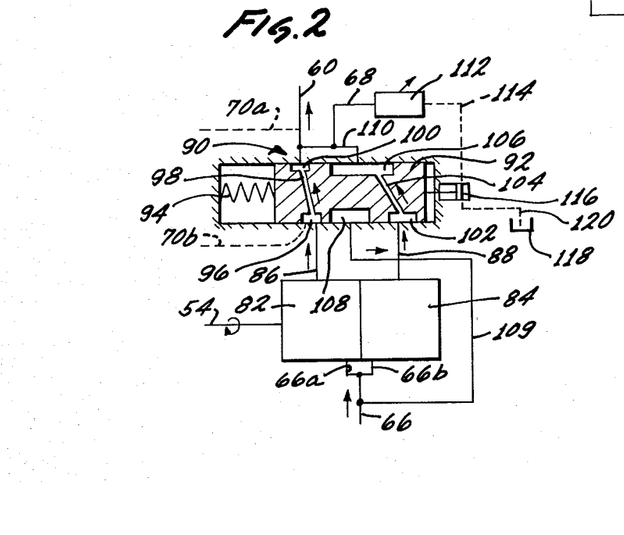
FIG. 2 is a schematic view illustrating the use of a plurality of fixed displacement pumps in supplying hydraulic fluid for operation of a variable auxiliary load through a valve mechanism with the valve mechanism being positioned to provide a high volume of fluid to the variable load.

FIG. 2 illustrates an embodiment of the noise reduction system in which a plurality of fixed displacement pumps, indicated as 82 and 84, are used to supply hydraulic fluid through line 60 to the variable load 58. As indicated, the fluid line 66 may be branched with branch 66a feeding to the inlet of pump 82 while branch 66b feeds to the inlet of pump 84. The outlet from pump 82 may be fed through an outlet line 86 while the outlet from pump 84 may be directed to an outlet line 88. Both lines 86 and 88 are directed to a valve generally indicated as 90 which controls the flow of hydraulic fluid from the pumps 82 and 84 to the hydraulic line 60.

The valve 90, as illustrated in FIG. 2, may include a valve body 92 which is biased through a spring 94 to the position illustrated. The outlet line 86 may be fed to an inlet port 96 leading to a passage 98 which terminates at an outlet port 100. The outlet line 88 may, in turn, lead to an inlet port 102 connected through a passage 104 to an outlet port 106. The outlet port 106 is, in turn, connected through a line 110 to the hydraulic line 60 directed to the variable load 58.

With the valve body 92 in its position shown in FIG. 2, both of the pumps 82 and 84 function to deliver hydraulic fluid to the line 60. The line 60, therefore, receives a high volume of hydraulic fluid as required, for example, to operate the load 58 during a high-volume portion of the load cycle.

The pump control line 68, as previously described, may be connected to the outlet line 110 with the pump control line leading to a pressure opening valve 112 and then to a control line 114 directed to a control piston 116. When the pressure in the outlet line 110 increases to a predetermined level, e.g., during a change from a high-volume portion of the load cycle to a high-pressure portion of the load cycle, the pressure in line 110 may open the valve 112 to direct hydraulic fluid under pressure to the control piston 116. When this occurs, movement of the control piston 116 then overcomes the force of the biasing spring 94 to shift the valve body 92 to the left from its position shown in FIG. 2. The valve body 92 in its shifted position is illustrated in FIG. 3 in which the volume of hydraulic fluid supplied to the variable load 58 by the pumps 82 and 84 has been reduced.

Figure 3:
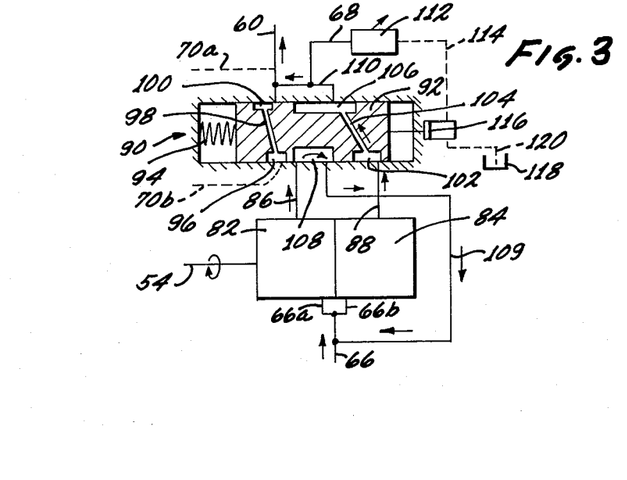
FIG. 3 is a schematic view of the system illustrated in FIG. 2 in which the valve mechanism has been shifted in response to high pressure demands from the auxiliary load to reduce the volume of hydraulic fluid being fed to the load.

With the valve body 92 in its shifted position in FIG. 3, the hydraulic fluid discharged by pump 82 may be directed through line 86 to a port 108 which is connected to a return line 109 that returns the fluid to line 66 where it is again directed to the pumps 82 and 84. Thus, the pump 82 does not supply fluid to the variable load 58 and the load receives fluid only from pump 84. Thus, even though the pressure of hydraulic fluid supplied to the load 58 has been increased, the reduction in the volume of hydraulic fluid supplied to the load permits maintaining the torque input to drive the pumps 82 and 84 at a sufficiently low level which can be supplied by engine 2 without stalling of the engine and while maintaining the engine speed near the idling speed of the engine.

In the shifting of the valve body 92 to its position shown in FIG. 3, excess hydraulic fluid received by the control piston 116 through line 114 may be fed to a sump 118 through a return line 120. The sump 118 may lead to the reservoir 64 or the sump and reservoir may be made integral with the result that hydraulic fluid received by the sump is returned to the closed loop system including the reservoir, pump 56, and the variable load 58.

When the pressure demands of the variable load 58 are decreased, the decrease in the demand pressure is noted through control line 68 which may then permit the valve 112 to close with the valve body 92 returning to its normal position under the influence of biasing spring 94. The valve body 92 will then occupy the position shown in FIG. 2 with both pumps 82 and 84 supplying hydraulic fluid to the variable load 58 through line 60 to satisfy the demands of the load during a high-volume portion of the load cycle.

As described previously, the control line 70 may be used to sense the pressure and volume demands of the variable load 58 to control the torque output of engine 2 in preventing engine stalling while maintaining the engine speed near the idling speed. If desired, the control line 70 may be composed of two separate portions illustrated in FIGS. 2 and 3 as 70a and 70b. The line 70a may be directly connected to line 60 to sense the pressure demands of the load 58 while the line 70b may be connected to inlet port 96 to sense the volume demands of the variable load. With valve body 92 in its position shown in FIG. 2, hydraulic pressure is sensed through both lines 70a and 70b. However, when the valve body is shifted to its position shown in FIG. 3, no pressure is received through line 70b since the discharge from the pump 82 is recycled through the return line 109. The absence of pressure in line 70b during this condition, thus, indicates that the volume demands of the variable load 58 have been reduced.

In utilizing the pressures received through lines 70a and 70b in controlling the fuel flow to the engine 2, the pressures received through lines 70a and 70b may, for example, be fed to separate surfaces of a differential piston with the total pressure on the piston being dependent upon the pressures received through both lines 70a and 70b. In this manner, an engine governor, as illustrated generally at 72 in FIG. 1, may be made responsive to both the pressure and volume demands of the variable load 58 in determining the fuel supplied to engine 2. Since the torque input required to drive the pumps 82 and 84 is determined by both the volume and pressure of the fluid received by the variable load 58, the summation of pressures received through lines 70a and 70b by the engine governor 72 may be directly related to the torque requirements of the pump. In this manner, the torque output of the engine 2 may be tailored to supply the torque input to the pump 56 in meeting the volume and pressure demands of variable load 58.

Figure 4:
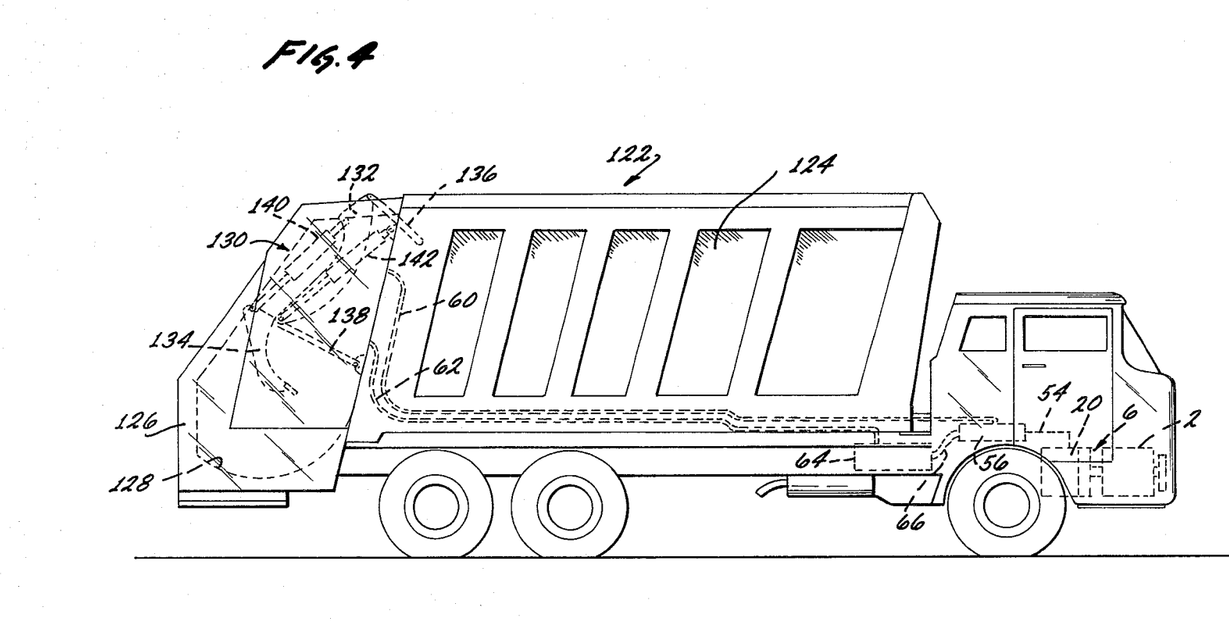
FIG. 4 is a side view of a refuse vehicle using the present noise reduction apparatus in providing power from the truck engine to drive a refuse packing mechanism through a pump, a torque converter and an automatic transmission with the torque converter being locked up to provide efficient transfer of power from the engine to the pump even though the engine is operating at a low speed near its idling speed.

As stated previously, a principal use of the present noise reduction system or apparatus is in supplying power for a refuse packing mechanism which is a variable volume and variable pressure auxiliary load. FIG. 4 illustrates the application of the present system and apparatus in providing power to a refuse packing mechanism. As shown, a garbage truck 122 may include a storage container 124 mounted on the truck frame with a tailgate assembly 126 pivotally secured to the rear of the storage container. The tailgate assembly may include a loading hopper 128 into which refuse is dumped and a packing mechanism 130 positioned above the loading hopper within the tailgate assembly.

The packing mechanism 130 may include, for example, an upper packing plate 132 and a lower packing plate 134 pivotally secured to the upper packing plate. The upper packing plate 132 may be mounted for rocking movement within the tailgate assembly 126 by means of levers 136 and 138 which are pivotally secured at their inner ends to the storage container 124. The movement of the lower packing plate 134 with respect to the upper packing plate 132 may be controlled by a hydraulic motor 140 which is connected between the upper packing plate and lower packing plate while movement of the upper packing plate may be controlled by a hydraulic motor 142 having its inner end pivotally secured to the storage container 124.

During operation of the packing mechanism 130, the demands of the packing mechanism, in terms of the volume and pressure of the hydraulic fluid required for its operation, will vary considerably. Thus, when refuse is swept from the loading hopper 128 through rotational movement of the lower packing plate 134, the pressure demands of the system will be relatively low. However, when the refuse is then moved upwardly through movement of both the upper packing plate 132 and lower packing plate 134, the pressure demands of the system will be relatively high. During this movement, the refuse is forced through an opening into the storage container 124 into contact with a movable packing plate within the refuse container 124 to compact the refuse against the movable packing plate. After compacting the refuse, the lower packing plate 134 may be rotated rearwardly with both the upper packing plate 132 and the lower packing plate then undergoing downward and rearward movement to again sweep refuse from the loading hopper 128, etc.

As indicated, the hydraulic line 60 may be used to feed hydraulic fluid to the packing mechanism 130 with hydraulic fluid being returned from the packing mechanism through line 62. On return of the hydraulic fluid through line 62, the fluid may be fed to the reservoir 64 and then through line 66 to the pump 56. The pump, as indicated, is driven through a drive shaft or drive train 54 which is connected to the automatic transmission 20 with the drive shaft or drive train receiving power from the truck engine 2 through torque converter 6. As described previously, the torque converter 6 is locked up during the operation of the engine 2 in supplying power to the pump 56. Thus, the engine 2 may be operated at a low speed near the engine idling speed in delivering power to the pump 56 with the power being efficiently conveyed to the pump through the torque converter 6 which is locked up to prevent hydraulic slippage while the engine performs a secondary work function.

I claim:

1. A noise reduction apparatus for operating a variable volume and variable pressure load, said apparatus comprising:

pump means having a capacity which is sufficiently large to supply said load at a relatively low pump speed;

engine means operably connected to said pump means through a torque converter and an automatic transmission for supplying power to said pump means in performing a secondary work function at a speed near the idling speed of said engine means;

said torque converter including a converter pump driven by said engine means and a converter turbine connected to said automatic transmission;

lockup means and a governor controlling said lockup means to lock the converter pump to the converter turbine at predetermined intervals during the shift pattern of said automatic transmission when the engine means is performing its primary work function, and bypass means to bypass said governor and to actuate said lockup means at speeds near the idling speed of said engine means when the engine means is supplying power to said pump means in performing a secondary work function, whereby the engine means operates in the low noise level region of speeds near its idling speed when supplying power for the pump means through said torque converter and automatic transmission with the torque converter locked up to eliminate slippage between the converter pump and converter turbine.

2. The noise reduction apparatus of claim 1 including a power take off connected to said transmission, and said engine means being operably connected to said pump means through said torque converter and said power take off.

3. The noise reduction apparatus of claim 1 including actuating means which is manually operable in actuating the bypass means to bypass the governor in actuating the lockup means at speeds near the idling speed of the engine means.

4. The noise reduction apparatus of claim 3 wherein said actuating means includes a solenoid and switch means to actuate the bypass means.

5. The noise reduction apparatus of claim 2 including engaging means to engage or disengage the power take off from said transmission.

6. The noise reduction apparatus of claim 3 including a power take off connected to said transmission;

said engine means being operably connected to said pump means through said torque converter and said power take off, and said actuating means being operably connected to both the bypass means and power take off, whereby the bypass means and power take off are actuated in unison in driving the pump means by the engine means operating near its idling speed through the torque converter, the transmission and the power take off with the torque converter locked up to eliminate slippage between the converter pump and the converter turbine.

7. The noise reduction apparatus of claim 1 including a fluid reservoir in flow communication with said pump means and said variable load to provide a variable volume of hydraulic fluid for operation of the variable load.

8. The noise reduction apparatus of claim 1 wherein said pump means is a variable displacement pump, and including means to control the displacement of said variable displacement pump in response to the demands of the variable load.

9. The noise reduction apparatus of claim 1 wherein said pump means includes a plurality of fixed displacement pumps supplying hydraulic fluid to the variable load, and means to vary the number of pumps supplying fluid to the variable load in response to the demands of the load.

10. The noise reduction apparatus of claim 9 wherein the number of fixed displacement pumps supplying fluid to the variable load is decreased when the pressure demands of the load are increased, whereby the torque required to drive said pump means is maintained below a predetermined level which is supplied by the engine means operating near its idling speed.

11. The noise reduction apparatus of claim 1 including engine governor means to assist in maintaining the horsepower output of said engine means at a level sufficient to drive the pump means while maintaining said engine means at a speed near its idling speed.

12. The noise reduction apparatus of claim 11 wherein said engine governor means includes throttle control means which govern the flow of fuel to the engine means in maintaining the torque output of the engine means at a level sufficient to operate the pump means under the load conditions imposed by the variable load.

13. The noise reduction apparatus of claim 1 wherein said variable volume and variable pressure load is a refuse packing mechanism.

14. The noise reduction apparatus of claim 6 wherein said variable volume and variable pressure load is a refuse packing mechanism.

15. In combination for reducing noise from a vehicle engine in driving an auxiliary mechanism disposed on a vehicle where the mechanism is auxiliary to the operation of the vehicle, a torque converter operable by the vehicle engine;

an automatic transmission operable by the torque converter;

pump means having a capacity sufficiently large to operate the auxiliary mechanism, the pump means being responsive to the operation of the automatic transmission to drive the auxiliary mechanism;

lockup means operative to lock the torque converter to the automatic transmission;

governor means responsive to the speed of the engine means for providing an operation of the lockup means at relatively high speeds above a particular value during the operation of the engine means in driving the vehicle; and bypass means for bypassing the governor means and for operating the lockup means to lock the torque converter to the automatic transmission at low engine speeds below the particular value during the operation of the auxiliary mechanism by the pump means.

16. In the combination set forth in claim 15, the auxiliary mechanism being constructed to operate on a cyclic basis and to provide a variable load at different times in the cycle and the pump means being constructed to introduce a variable amount of fluid to the auxiliary mechanism to drive the auxiliary mechanism in accordance with the variable load during the cyclic operation of the auxiliary mechanism.

17. In the combination set forth in claim 15,
the bypass means including valve means having first and second operative positions and operative in the first position to provide for an operation of the governor at the high speeds above the particular value to obtain a direct drive of the automatic transmission by the torque converter in driving the vehicle and operative in the second position to bypass the governor at the low speeds below the particular value to obtain a direct drive of the automatic transmission by the torque converter in driving the auxiliary mechanism.

18. In the combination set forth in claim 17, including,
switch means having first and second operative relationships and operative in the first relationship to obtain an operation of the auxiliary mechanism and operative in the second relationship to prevent an operation of the auxiliary mechanism;
means operative in the first relationship of the switch means to obtain an operation of the valve means in the second position; and
power take off means operative in the first relationship of the switch means to couple the pump means to the automatic transmission to obtain an operation of the auxiliary mechanism.

19. In the combination set forth in claim 18,
the auxiliary mechanism being included in refuse equipment to pack refuse in the refuse equipment.

20. In combination in a vehicle,
engine means having a variable speed of operation;
an auxiliary mechanism constructed to perform an auxiliary function independent of the movement of the vehicle;
a torque converter driven by the engine means;
an automatic transmission adapted to be driven by the torque converter;
pump means having variable characteristics and operatively coupled to the auxiliary mechanism to drive the auxiliary mechanism;
lockup means operative to produce a direct drive of the automatic transmission by the torque converter;
a governor responsive to the speed of the engine means for operating the lockup means at relatively high speeds above a particular value during the operation of the engine means in driving the engine;
switch means having first and second states of operation and operative in the first state to provide for the operation of the auxiliary mechanism and operative in the second state to prevent the operation of the auxiliary mechanism; and
bypass means operative with the switch means in the first state of operation for bypassing the governor and obtaining an operation of the lockup means at low engine speeds below the particular value.

21. In the combination set forth in claim 20,
a power take off engageable with the automatic transmission and operatively coupled to the pump means when engaged by the automatic transmission, and
means operative in the first relationship of the switch means to provide for an engagement of the power take off by the automatic transmission.

22. In the combination set forth in claim 21,
the auxiliary mechanism being operable on a cyclic basis and being constructed to provide a variable load at different times in each cycle and the pump means having variable characteristics to provide the auxiliary mechanism with the variable load during the operation of the auxiliary mechanism on a cyclic basis.

23. In combination for reducing noise from a vehicle engine in driving an auxiliary mechanism disposed on a vehicle where the auxiliary mechanism is auxiliary to the operation of the vehicle,
switch means having first and second states of operation and operable in the first state to provide for an operation of the auxiliary mechanism and operable in the second state to prevent an operation of the auxiliary mechanism;
a torque converter operable by the engine to drive the vehicle and the auxiliary mechanism;
an automatic transmission operable by the torque converter;
pump means having variable characteristics and operative to drive the auxiliary mechanism in accordance with the variable characteristics provided by the pump means;
first means responsive to the operation of the switch means in the first state to provide for a coupling between the automatic transmission and the pump means to obtain an operation of the pump means;
second means responsive to an operation of the engine at relatively high speeds above a particular value and to an operation of the switch means in the second state for providing for a coupling between the torque converter and the automatic transmission to obtain an operation of the automatic transmission by the torque converter; and
third means responsive to an operation of the engine at relatively low speeds below the particular value and to an operation of the switch means in the first state for providing for a coupling between the torque converter and the automatic transmission to obtain an operation of the automatic transmission by the torque converter.

24. In the combination set forth in claim 23,
the first means including a power take off operation to provide the coupling between the automatic transmission and the pump means and further including solenoid means operative upon the operation of the switch means in the first state to obtain an operation of the power take off.

25. In the combination set forth in claim 23,
the second means including lockup means operative to provide the coupling between the torque converter and the automatic transmission and further including a governor responsive to the speed of the engine and to the operation of the switch means in the second state for providing an operation of the lockup means at the relatively high speeds above the particular value.

26. In the combination set forth in claim 23,
the third means including valve means having first and second operative relationships and operative in the first relationship, with the switch means in the second state, to provide for an operation of the second means in producing a coupling between the torque converter and the automatic transmission at the relatively high speeds above the particular value and operative in the second relationship, with the switch means in the first state, to provide for a coupling between the torque converter and the automatic transmission at the relatively low speeds below the particular value to obtain an operation of the automatic transmission by the torque converter, the valve means being normally disposed in the first operative relationship and being operative to the second relationship upon the operation of the switch means in the first state.

27. In the combination set forth in claim 25,
the third means including valve means having first and second operative relationship and normally biased in the first relationship and operative to the second relationship upon the operation of the switch means in the first state and operative in the second relationship to bypass the governor and obtain an operation of the lockup means at the relatively low speeds below the particular value in coupling the torque converter and the automatic transmission.

28. A method of reducing noise from an engine in a vehicle where the vehicle includes a torque converter and an automatic transmission, including the following steps:
providing a coupling between the torque converter and the automatic transmission at relatively high speeds of the engine above a particular value;
providing for the operation of an auxiliary mechanism on the vehicle by the engine where the mechanism provides an operation different from propulsion of the vehicle;
providing a coupling between the torque converter and the automatic transmission at relatively low speeds of the engine below the particular value when the auxiliary mechanism is to be operated;
using the power from the engine at speeds near the idling speed, upon the coupling between the torque converter and the automatic transmission at the relatively low speeds of the engine below the particular value, to supply a fluid under pressure for operating the auxiliary mechanism; and
introducing the fluid under pressure to the auxiliary mechanism to operate the auxiliary mechanism.

29. A method as set forth in claim 28 wherein,
the torque converter is not coupled to the automatic transmission at relatively low speeds of the engine below the particular value to drive the vehicle; and
wherein the fluid under pressure is supplied to the auxiliary mechanism only when the auxiliary mechanism is to be operated.

30. The method set forth in claim 29 wherein the auxiliary mechanism is operated on a cyclic basis and is provided with a variable load at different times in each cycle of operation and wherein the amount of fluid introduced to the auxiliary mechanism at each instant is controlled in accordance with the load provided by the auxiliary mechanism at different times in each cycle of operation.

31. A method of operating an auxiliary hydraulic load having variable volume and pressure requirements at a low noise level where the auxiliary hydraulic load is included in a vehicle having an engine, a torque converter and an automatic transmission, said method including:
providing a pump whose capacity is sufficient to satisfy the variable hydraulic load;
providing a direct coupling between the torque converter and the automatic transmission at relatively high speeds above a particular value when the vehicle is to be driven and preventing such a direct coupling between the torque converter and the automatic transmission at relatively low speeds below the particular value when the vehicle is to be driven;
providing a direct coupling between the torque converter and the automatic transmission at relatively low speeds below the particular value when the auxiliary hydraulic load is to be operated;
providing a coupling between the automatic transmission and the pump at relatively low speeds below the particular value when the auxiliary load is to be operated;
conducting hydraulic fluid from the pump to the variable load at the relatively low speeds when the auxiliary load is to be operated; and
varying the volume of fluid discharged from the pump in response to the pressure demands of the variable load to maintain the maximum torque input requirements of the pump at a level which is compatible with the torque output of the engine.

32. A method as in claim 31, including the steps of:
governing the speed of the engine at the relatively high speeds above the particular value to provide the coupling between the torque converter and the automatic transmission at such speeds; and
bypassing the governing action in the speed of the engine at the relatively low speeds below the particular value and providing the coupling between the torque converter and the automatic transmission at such speeds when the governing action is bypassed.

33. A method as set forth in claim 31 wherein
the auxiliary hydraulic load is cyclic and is variable at different times in each cycle and wherein the pump provides a variable hydraulic load to the auxiliary hydraulic load in accordance with the load requirements of the auxiliary hydraulic load at the different times in each cycle.

34. A method as set forth in claim 33 wherein
the auxiliary hydraulic load provides a packing of refuse in refuse equipment.

35. In the combination set forth in claim 21,
the auxiliary mechanism being included in refuse equipment to pack refuse in the refuse equipment.

36. In the combination set forth in claim 23,
the auxiliary mechanism being included in refuse equipment to pack refuse in the refuse equipment.

* * * * *